(12) United States Patent
Hosier et al.

(10) Patent No.: US 6,654,058 B1
(45) Date of Patent: Nov. 25, 2003

(54) RESETTABLE PIXEL AMPLIFIER FOR USE IN A PHOTOSENSOR ARRAY

(75) Inventors: Paul A. Hosier, Rochester, NY (US); Pravin N. Kothari, Poughkeepsie, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/389,622

(22) Filed: Sep. 3, 1999

(51) Int. Cl.[7] .......................... H04N 3/14; H04N 5/335
(52) U.S. Cl. ..................................................... 348/301
(58) Field of Search ................................. 348/300, 301, 348/294, 302

(56) References Cited

U.S. PATENT DOCUMENTS

| | | | |
|---|---|---|---|
| 4,814,648 A | * 3/1989 | Hynecek | 330/253 |
| 4,857,476 A | 8/1989 | Colinge | 437/33 |
| 4,958,133 A | 9/1990 | Bazes | 330/253 |
| 5,101,174 A | * 3/1992 | Hynecek | 330/264 |
| 5,216,380 A | * 6/1993 | Carbou | 330/253 |
| 5,296,696 A | * 3/1994 | Uno | 348/246 |
| 5,493,423 A | * 2/1996 | Hosier | 348/300 |
| 5,663,915 A | * 9/1997 | Mobley | 365/208 |

FOREIGN PATENT DOCUMENTS

JP 02-039607 A * 2/1990 ............. H03F/3/34

OTHER PUBLICATIONS

Bazes, "Two Novel Fully Complementary Self–Biased CMOS Differential Amplifiers", IEEE Journal of Solid–State Circuits, vol. 26, No. 2, Feb. 1991, pp. 165–168.

* cited by examiner

Primary Examiner—Wendy R. Garber
Assistant Examiner—Jason Whipkey
(74) Attorney, Agent, or Firm—R. Hutter

(57) ABSTRACT

A set of CMOS-based amplifiers amplify signals from a set of photosensors within a large photosensitive imaging device. When the imaging device reads out image signals, each amplifier is selected for operation only within a brief time window when the particular photosensor associated therewith is reading out. Incidental to reading out a signal through a particular amplifier, all nodes which are capacitively coupled to the input node of the amplifier are biased to a known magnitude. In this way, residual charges remaining in the amplifier from a previous readout will not distort subsequent signals read through the amplifier.

6 Claims, 3 Drawing Sheets

RESETTABLE PIXEL AMPLIFIER FOR USE IN A PHOTOSENSOR ARRAY

CROSS REFERENCE TO RELATED APPLICATION

Cross-reference is made to the following U.S. Pat. No. 6,552,324, for "Selectable Pixel Amplifier for Use in a Photosensor Array", assigned to the Assignee hereof.

FIELD OF THE INVENTION

The present invention relates to an image sensor array, such as found, for example, in digital scanners, copiers, and facsimile machines. More particularly, the present invention relates to a selectable amplifier which can be associated with at least one individual photosensor in such a sensor array.

BACKGROUND OF THE INVENTION

Image sensor arrays typically comprise a linear array of photosensors which scan an image-bearing document and convert the small image areas viewed by each photosensor to image signal charges. Following an integration time, the image signal charges are amplified and transferred to a common output line or bus through successively actuated multiplexing transistors.

In the scanning process, bias and reset charges are applied to each photosensor (such as a photodiode) in a predetermined time sequence during each scan cycle. In a particular embodiment of such an image sensor array, a two-stage transfer circuit is provided for transferring the image signal charges from the photodiodes. A bias charge is applied to each photodiode through a bias charge injection transistor coupled to a node between the photodiode and the input to the transfer circuit. From the transfer circuit, the image-based charges are caused to pass through an amplifier circuit, one amplifier circuit being typically provided for each photodiode, or at least to each RGB-color triplet of color-sensitive photodiodes.

In an active photosensor array it is typical to have individual photosensors transfer image-related charges therefrom onto capacitors, one capacitor being associated with each photosensor. This "reset capacitor" temporarily stores the image-related charge, which is subsequently transferred through an amplifier associated with the reset capacitor. Then the amplified voltage signal resulting from the transfer is read out as a video signal on a video line.

The present invention is generally directed to the design of an amplifier which can be associated with an individual reset capacitor which in turn is associated with a particular photosensor in an image sensor array. As is known in the prior art, particularly in the '423 patent referenced below, a preferred design for an image sensor array having an amplifier associated on a one-to-one basis with a set of photosensors is to have each amplifier be "selectable" so that the amplifier is fully operational only during the short period of time when the particular amplifier is transferring a charge from a reset capacitor onto the video line: for the bulk of the time of operation, when the particular reset capacitor is not transferring a signal onto the video line, the amplifier is "deselected," or another words put in a low-power-consumption mode, thus saving power consumption of the entire array.

A practical problem which occurs when using selectable amplifiers in the image sensor array is that, when an amplifier associated with a particular reset capacitor and photosensor is deselected following a signal transfer, a residual charge remains within the amplifier circuitry, and this residual charge will capacitively couple unpredictable amounts of charge onto the reset node capacitance for the next time an image-related charge is transferred from the capacitor onto the video line. This unpredictable additional amount of charge thus placed on the reset capacitor will distort the signal charge of the subsequent image reading.

It is an object of the present invention to provide circuitry for a selectable pixel amplifier which will reset to a known voltage following every readout from a reset capacitor onto a video line.

DESCRIPTION OF THE PRIOR ART

Bazes, "Two Novel Fully Complementary Self-Biased CMOS Differential Amplifiers," *IEEE Journal of Solid-State Circuits*, Vol. 26, No. 2, February 1991, pp. 165–168, discloses designs of differential amplifiers having fully complementary configurations and which are self-biased through negative feedback. U.S. Pat. Nos. 4,857,476 and 4,958,133 by the same author show related amplifier designs.

U.S. Pat. No. 5,493,423 discloses an amplifier circuit which can be associated with an individual photosensor in an image sensor array. With each cycle of passing an image signal through an amplifier, a low standby current is applied to certain transistors within the amplifier until the next signal is to be output. Critical nodes within the amplifier are caused to settle to known charge values before each image signal is passed therethrough.

SUMMARY OF THE INVENTION

According to one aspect of the present invention, there is provided an image sensor array, comprising a plurality of photosensors, with a transfer circuit associated with each photosensor. Selection means cause each transfer circuit to output an image-related charge to an output line. An amplifier is interposed between each transfer circuit and the output line, the amplifier including an input node connected to the reset capacitor, and an input stage connected to the input node. The input stage includes a plurality of transistors, the transistors in the input stage forming a set of input stage nodes capacitively coupled to the input node. Reset means cause all of the input stage nodes in the amplifier to be biased to at least one known magnitude incidental to the amplifier transferring a charge from the transfer circuit to the output line.

DETAILED DESCRIPTION OF THE INVENTION

Figure 1:
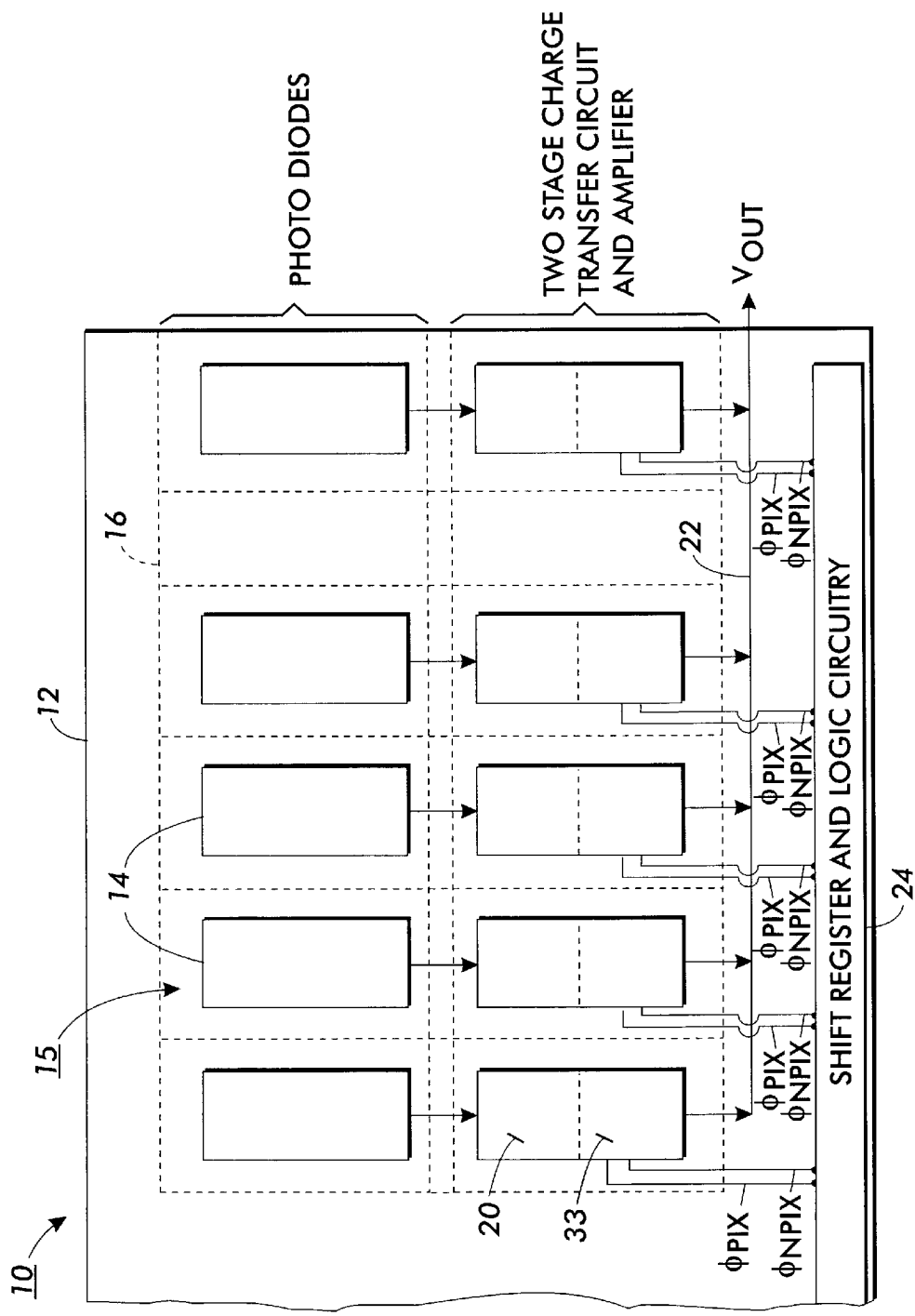
FIG. 1 is a schematic view of an image scanning array having an array of photosensor cells, each cell having a photodiode with two-stage transfer circuit and amplifier for transferring image signal charges from the photodiodes to a common output bus.

FIG. 1 shows an image sensor array with two stage transfer, designated generally by the numeral 10, of the type to which the present invention is directed. Image sensor array 10 includes a chip 12 of silicon with a plurality of photosites in the form of photodiodes 14 thereon. Photodiodes 14 are in closely spaced juxtaposition with one another on chip 12 in a linear array or row 16. Several smaller arrays such as array 10 can be abutted together end to end with one another to form a longer array, i.e., a full width or contact array, with spacing between the photodiodes inside the chip thereby maintaining photodiode pitch across the entire full width of the composite array.

While photodiodes 14 are shown and described herein, other photosite types such as amorphous silicon or transparent electrode MOS type photosites may be envisioned. Further, while a one dimensional sensor array having a single row 16 of photodiodes 14 is shown and described herein, a two dimensional sensor array with plural rows of photodiodes may be contemplated.

Each photodiode 14 has a two stage transfer circuit 20 associated therewith which together with the photodiode and an amplifier 33 form a photosite cell 15 at the array front end. In each cell 15, the image signal charge from the photodiode 14 is amplified to bring the image signal charge to a desired potential level prior to transferring the charge to a common video output line or bus 22. Suitable shift register and logic circuitry 24 provides timing control signals ΦPIX (with an optional complement, ΦNPIX) for connecting each pixel cell 15 to bus 22 in the proper timed sequence; a shift register such as 24 typically includes a set of stages therein, each stage in this embodiment being associated with one photosite cell 15, and thus associated with one amplifier, as can be seen as the set of ΦPIX and ΦNPIX lines emerging from shift register 24.

Image sensor array 10 may for example be used to raster scan a hard-copy document, and in that application, the document and sensor array 10 are moved or stepped relative to one another in a direction (i.e., the slow scan direction) that is normally perpendicular to the linear axis of array 10. At the same time, the array scans the document original line by line in the direction (i.e., the fast scan direction) parallel to the linear axis of the tray. The image line being scanned is illuminated and focused onto the photodiodes 14. During an integration period, a charge is developed on each photodiode proportional to the reflectance of the image area viewed by each photodiode. The image signal charges are thereafter transferred by two stage transfer circuits 20 via amplifier 33 to output bus 22 in a predetermined step by step timed sequence.

Preferred designs for the transfer circuits 20 can be found in U.S. Pat. Nos. 4,737,854; 5,081,536; or U.S. Pat. No. 5,105,277. In each of these references the transfer circuit 20 is of the "two-stage transfer" type, although it is conceivable to use the amplifier of the present invention with, for instance, a single-stage transfer circuit associated with each photodiode.

Figure 2:
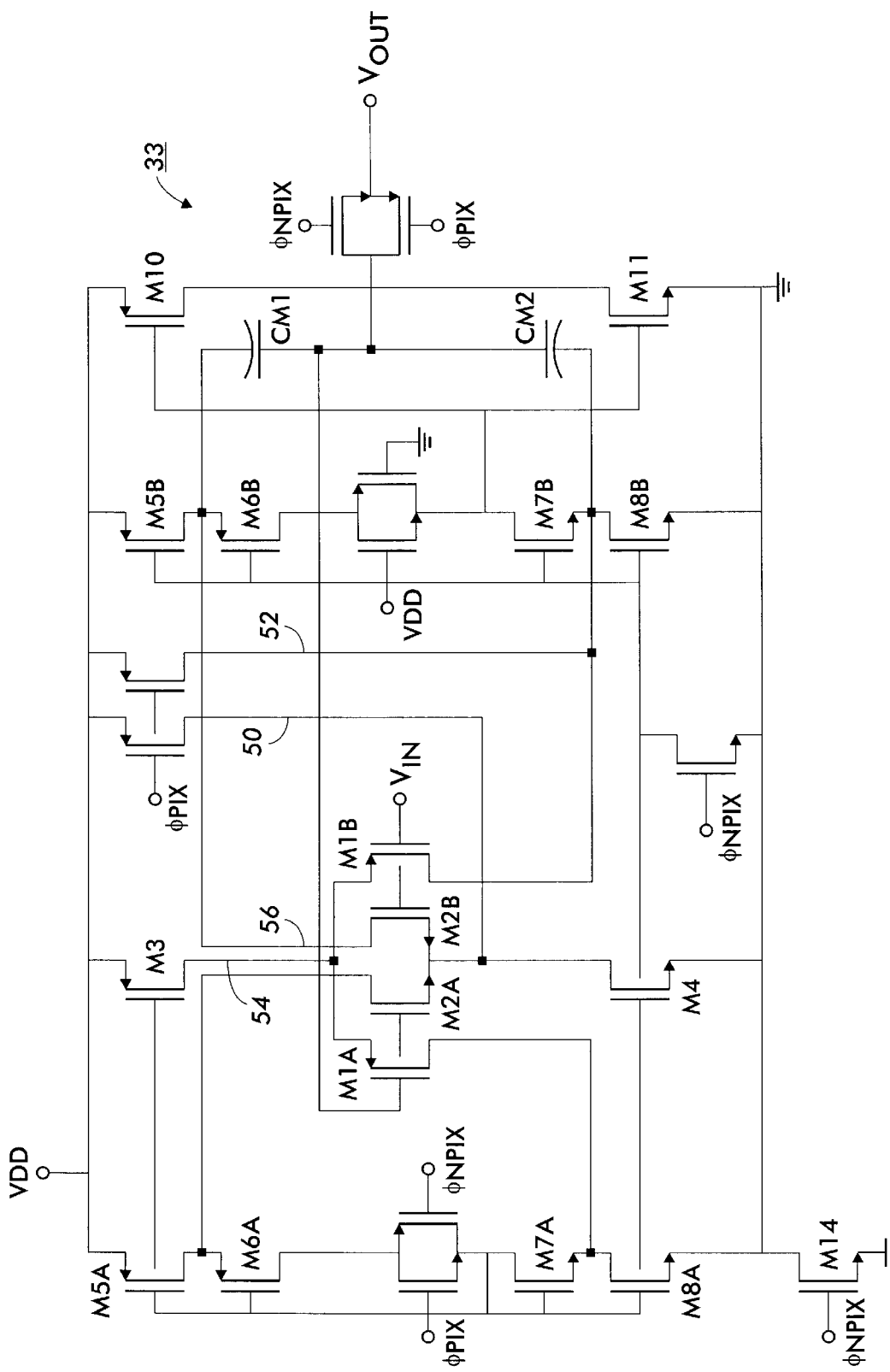
FIG. 2 is a schematic diagram of a selectable amplifier circuit, as could be used in the sensor array of FIG. 1, according to the present invention.

FIG. 2 is a schematic view of a design of amplifier which could be used as amplifier 33 in the context of the image sensor array of FIG. 1. The amplifier shown in FIG. 2 is conceptually similar to the "very-wide-common-mode-range differential amplifier," or VCDA, described in the article by Bazes referenced above. Both the FIG. 2 amplifier and the Bazes design represent a CMOS differential amplifier with wide input dynamic range, which is fully complementary and entirely self-biased. The design shown in FIG. 2 is particularly useful for providing a desirably linear unity-gain amplification from zero to VDD (in terms common in the art of CMOS circuitry, this is known as the "voltage of the drain," or full power supply range).

In overview, the basic amplifier of FIG. 2 functions as follows. The amplifier, generally indicated as 33, accepts an image-based voltage signal $V_{input}$ from the reset capacitor in the associated transfer circuit 20 and ultimately outputs a voltage signal $V_{output}$ to the video output line. There is provided, at $V_{input}$ a differential pair of p-devices M1A and M1B. The differential pair of p-devices M1A and M1B are combined as shown with a differential pair of n-devices, M2A and M2B. The p-devices M1A and M1B share a common current source, VDD actuable through transistor M3, while the sources of the n-differential pair M2A and M2B share a common ground actuable through transistor M4. The n-differential pair M2A and M2B is useful for providing an output $V_{output}$ in the range of 2–5 volts, while the p-differential pair M1A, M1B is useful for outputting voltages in the range of 0–3 volts. With reference to the claims below, the set of complementary CMOS transistor pairs M1A, M1B, M2A, and M2B forms a folded cascode amplifier in itself and represent the "input stage" for the overall amplifier 33.

Voltage source VDD forms balanced rails providing summing current to the two kinds of differential pairs, while the transistors M10 and M11 proximate to voltage source VDD form a push-pull output driver stage. The line connecting $V_{output}$ to the gate of devices M1A and M2A forms the feedback loop which causes the amplifier 33 to be a unity-gain amplifier.

As the input voltage $V_{input}$ rises from a low to high voltage, the p-type input devices M1A, M1B switch from full conduction to no conduction and the n-type devices M2A, M2B switch from no conduction to full conduction currents. In other words, the n-channel devices are inactive in the region near ground and the p-channel devices are inactive in the region near VDD. Between these extremes, both pairs are active.

The bias current to the pairs of devices M1A, M1B and M2A and M2B in the input stage is supplied by load devices M3 and M4. The currents through load devices M3 and M4 must be identical; any differences in currents through M3 and M4 devices would result in extreme shifts in amplifier-bias voltages. Therefore, external biasing of load device M3 for the p-channel pair and load device M4 for the n-channel pair is not desirable. The self-biasing scheme is created by connecting both M3 and M4 to a single internal bias node, indicated as $V_{bias}$ in FIG. 2. The self-biasing of the amplifier creates a negative-feedback loop that stabilizes the bias voltages for M3 and M4.

The current paths are formed by M3, M1A, and M8A or M3, M1B, and M8B for the p-devices, and are formed by M5A, M2A, and M4 or M5B, M2B and M4 for the n-devices. Precise balancing of currents through the two paths is dependent on the ratios of the devices M6A to M7A (and M6B to M7B) as well as M5A to M8A (M5B to M8B). The cascode stage formed by devices M5A, M6A, M7A, and M8A on the biasing side, and the cascode stage formed by devices M5B, M6B, M7B, and M8B on the output side are identical and complementary to each other. Each cascode stage forms a summing circuit for the currents through transistors M1A and M2A (or M1B and M2B) of the input stage.

The cascode stage formed by M5B through M8B drives the output buffering stage. The output stage is formed by two common-source output transistors M10 and M11. In order to provide a stable operation, capacitors CM1 and CM2 are used for frequency compensation. The output is fed back to the inputs of devices M1A and M2A of the differential amplifier. The input signal is connected to the gates of M1B and M2B as shown in FIG. 2. The differential amplifier output is in phase with the input signal.

Returning to FIG. 1, it is most desirable, from the standpoint of overall power consumption of the image sensor array 10 that individual amplifiers 33 be powered up for operation only in the narrow window of time during each readout in which the particular photodiode 14 associated with a single amplifier is transferring a signal therethrough. If a typical sensor array 10 on a single chip 12 includes approximately 250 photodiodes 14, it will be evident that the overall duty cycle of any individual amplifier 33 will be quite short in proportion to the total time of operation of the image sensor array 10.

The FIG. 2 amplifier includes, in addition to the original inputs and outputs $V_{input}$ and $V_{output}$, inputs for selecting the amplifier 33 as a whole: as shown in FIG. 2, there are inputs ΦPIX and ΦNPIX which are complements of each other. The inputs ΦPIX and ΦNPIX are readily derived from the standard suitable shift register and logic circuitry 24 such as shown in FIG. 1. When an input ΦPIX is high, the amplifier 33 is "selected" and operates as an amplifier. Significantly, when ΦPIX is low, and by definition when ΦNPIX is high, the amplifier 33 is powered down.

Looking at the different areas in which a high value of ΦNPIX (a "deselect" signal) affects the circuit of FIG. 2, it will first be noted that a high ΦNPIX will disconnect the output from any downstream circuitry, as shown at devices M12 and M13. A high value of ΦNPIX will also create a channel in transistor M14, which has the effect of shutting off all the n-devices M8A, M4, M8B. The activation of ΦNPIX at device M9B effectively removes any path between the n- and p-devices within the amplifier 33. An additional VDD input causes the amplifier 33 to match the impedance of a new signal when the amplifier 33 is next selected.

With particular regard to the present invention, in addition to the basic circuitry of amplifier 33, there is provided circuitry to ensure that, following each readout of an image signal by a particular amplifier 33, the amplifier 33 is reset, at its input node, to a consistent well-defined potential. As mentioned above, one practical problem with individually-selectable amplifiers is that, following the readout of each individual image-related charge from a transfer circuit, the amplifier is left with an unpredictable charge at its input node, and this unpredictable charge at the input node will couple to a subsequent image-related charge caused by the next reading from the photosensor; or, more briefly, a residual charge left on the amplifier will be a source of noise for a subsequent signal read through the amplifier. To address this problem, the present invention includes, in addition to the basic circuitry of an amplifier 33, means for deliberately resetting the potential on the input node following every transfer of charge from a reset capacitor to the video line through the amplifier. In a preferred embodiment of the present invention, this reset is accomplished by deliberately using the known power voltage VDD to reset all of the complementary CMOS transistor pairs forming the input stage for the amplifier 33. In the illustrated embodiment of FIG. 2, this input stage is represented by transistor pairs M1A, M1B, M2A, and M2B.

With particular reference to the FIG. 2 embodiment, it can be seen that there is provided two "input stage reset lines," indicated as 50 and 52, which selectably connect (when pixel signal $\Phi_{PIX}$ is low) the voltage VDD to, respectively, the node associated with transistors M2B and M1B respectively. Also, the other two nodes of the input stage transistors M1B and M2B are connected, via lines 54 and 56, to VDD incidental to the power-down structure of the circuitry 33. What is important within the design of the FIG. 2 embodiment is that when a particular amplifier 33 and a sensor array is deselected, all of the nodes which are capacitively coupled to the floating input $V_{input}$ are reset to a known value during reset and charge transfer. In this particular embodiment, the known value happens to be VDD for purposes of convenience, but it is conceivable that all the nodes could be deliberately reset to another known value, such as ground or some other fixed number: the design choice of what known value the nodes should be reset to will depend on the particular configuration of the amplifier as a whole.

Figure 3:
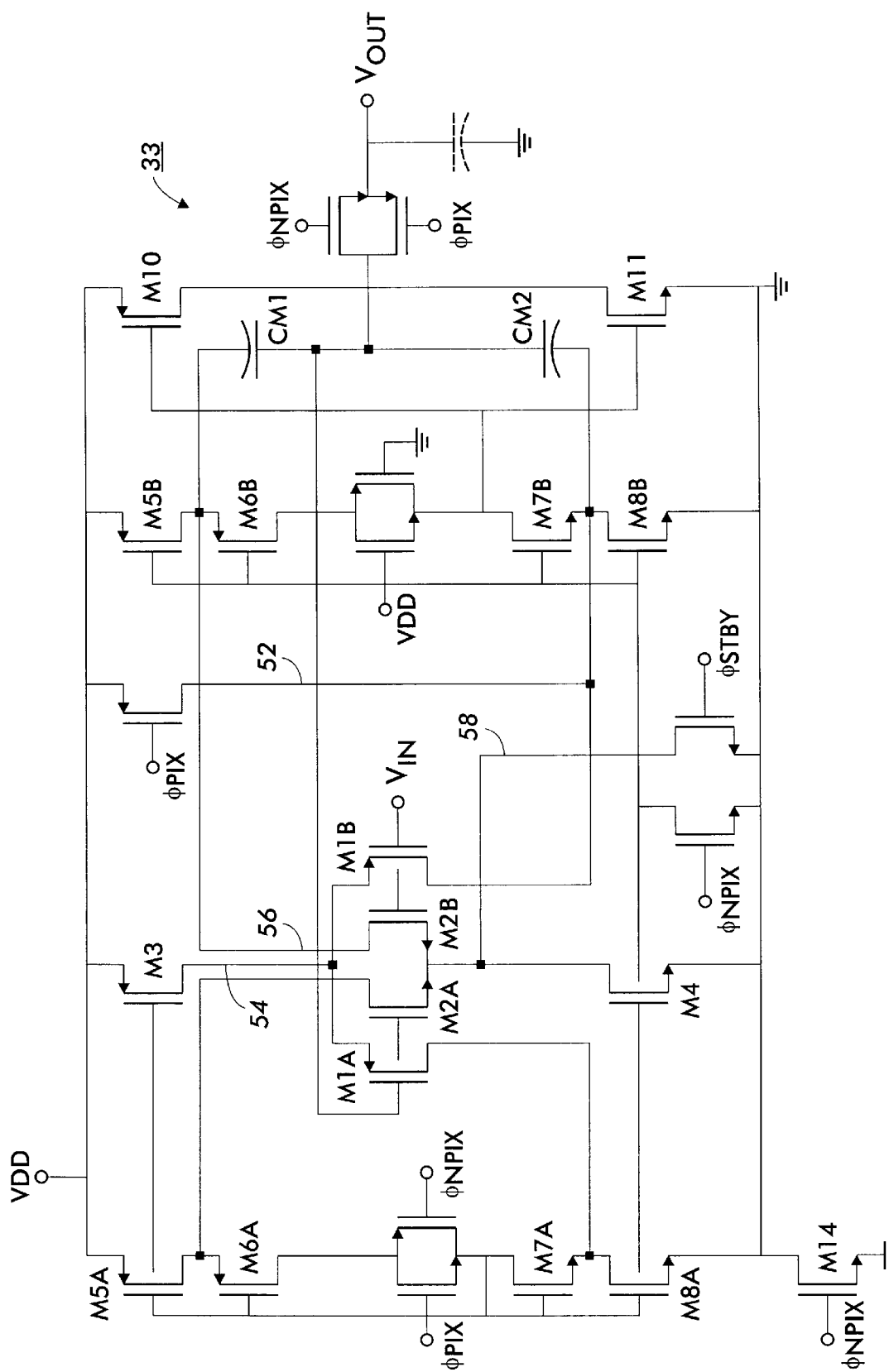
FIG. 3 is a schematic diagram of an amplifier circuit according to another embodiment of the present invention.

FIG. 3 shows an alternate embodiment of an amplifier according to the present invention, in which once again all of the nodes in the input stage are reset to known values, except in this case certain of the nodes are reset, through line 58 which substitutes for the line 50 in the FIG. 2 embodiment, not to the known VDD but to another predetermined potential ΦSTBY, a standby which may incidentally be available on the chip. (For instance, the circuit in the '423 patent described above includes provision for a relatively low fixed standby voltage available to the various amplifiers when they are not transferring a charge onto the video line.)

For the present invention to accomplish its purposes, the important factor is that all of the nodes which are capacitively coupled to the input node of the amplifier are reset to consistent well-defined values (which can generally be any value, as long as it is and predictable) incidental to every use of the amplifier for transferring a charge ultimately from a photodiode to a video line. In the particular embodiments of FIGS. 2 and 3, these nodes are the transistors which form the input stage immediately relevant to the input node of the amplifier 33. However, it is conceivable, to accomplish the basic function of the present invention with, for example a software scheme, i.e., using a microprocessor-controlled device to artificially insert a predetermined charge or potential on the input node of each amplifier incidental to every use of the amplifier.

While the invention has been described in detail with reference to specific and preferred embodiments, it will be appreciated that various modifications and variations will be apparent. All such modifications and embodiments as may occur to one skilled in the art are intended to be within the scope of the appended claims.

What is claimed is:

1. An image sensor array, comprising:

a plurality of photosensors;

a transfer circuit associated with each photosensor;

an output line;

selection means for causing each of the plurality of transfer circuits to output an image-related charge to the output line;

an amplifier interposed between each transfer circuit and the output line, the amplifier including:

means for providing a relatively high power level to the amplifier when the selection means causes the transfer circuit to output an image-related charge, the amplifier receiving a relatively low power level at other times, an input node connected to a reset capacitor, and an input stage connected to the input node, the input stage including a plurality of transistors, the transistors in the input stage forming a set of input stage nodes capacitively coupled to the input node; and reset means for causing all of the input stage nodes in the amplifier to be biased to at least one known magnitude while the amplifier is receiving a relatively low power level.

2. The array of claim 1 the input stage of the amplifier having a first differential pair including two p-devices and a second differential pair, complementary to the first differential pair, including two n-devices, each of the p-devices and the n-devices having an input stage node associated therewith.

3. The array of claim 1 the amplifier comprising CMOS circuitry and the reset means causing at least one input stage node to be biased to a CMOS voltage of the drain.

4. The array of claim 1, wherein the relatively low power level is zero.

5. The array of claim 1, wherein the known magnitude is a full power supply available to the array.

6. The array of claim 1, wherein the known magnitude is ground.

* * * * *